(12) United States Patent
Bertram et al.

(10) Patent No.: US 9,813,305 B2
(45) Date of Patent: *Nov. 7, 2017

(54) ENABLING A TAG TO SHOW STATUS

(71) Applicant: International Business Machines Corporation, Armonk, NY (US)

(72) Inventors: Randal L. Bertram, Raleigh, NC (US); Gregory R. Hintermeister, Rochester, MN (US); Geraint North, Manchester (GB); Paul B. Tippett, Raleigh, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 221 days.

This patent is subject to a terminal disclaimer.

(21) Appl. No.: 14/451,840

(22) Filed: Aug. 5, 2014

(65) Prior Publication Data

US 2016/0043904 A1    Feb. 11, 2016

(51) Int. Cl.
  *G06F 17/30*    (2006.01)
  *H04L 12/24*    (2006.01)
  *H04L 12/911*   (2013.01)

(52) U.S. Cl.
  CPC ........ *H04L 41/22* (2013.01); *G06F 17/30554* (2013.01); *H04L 47/70* (2013.01); *H04L 41/5096* (2013.01)

(58) Field of Classification Search
  CPC ........... G06F 17/30554; G06F 17/3061; G06F 17/30864; G06F 17/30994; G06F 17/30286; G06F 11/324; G06F 3/14; G06F 17/3012; H04L 41/5096; H04L 41/22; H04L 47/70

USPC ......................................................... 707/722
See application file for complete search history.

(56) References Cited

U.S. PATENT DOCUMENTS

| | | | |
|---|---|---|---|
| 5,987,480 A    | 11/1999 | Donohue et al. | |
| 6,697,948 B1 * | 2/2004  | Rabin ..................... | G06F 21/10 705/52 |
| 7,457,853 B1   | 11/2008 | Chari et al. | |
| 7,590,647 B2   | 9/2009  | Srinivasan et al. | |
| 7,774,713 B2 * | 8/2010  | Mital .................... | G06F 9/4443 715/763 |
| 7,827,110 B1 * | 11/2010 | Wieder .................. | G06F 21/10 705/51 |
| 7,930,629 B2 * | 4/2011  | Hurst-Hiller ..... | G06F 17/30893 709/248 |
| 8,250,048 B2 * | 8/2012  | Yalamanchi ...... | G06F 17/30958 707/705 |

(Continued)

OTHER PUBLICATIONS

U.S. Appl. No. 14/497,794, entitled "Performing Actions on Objects as a Result of Applying Tags to the Objects", filed Sep. 26, 2014.

(Continued)

*Primary Examiner* — Thanh-Ha Dang
(74) *Attorney, Agent, or Firm* — Patterson + Sheridan, LLP

(57) ABSTRACT

System, method, and computer program product to display the status of tags applied to objects in a cloud computing environment, by comparing an attribute of an object to a criterion of a tag applied to the object, wherein the object is part of the cloud computing environment, and outputting for display a graphical representation of the tag, wherein the graphical representation comprises a text of the tag and an indication of a result of the comparison.

17 Claims, 7 Drawing Sheets

(56) References Cited

U.S. PATENT DOCUMENTS

| | | | |
|---|---|---|---|
| 9,081,798 B1 | 7/2015 | Wong | |
| 2001/0013024 A1* | 8/2001 | Takahashi | G06F 21/10 |
| | | | 705/59 |
| 2002/0143816 A1 | 10/2002 | Geiger et al. | |
| 2006/0112152 A1* | 5/2006 | Napier | G06F 8/68 |
| 2006/0155738 A1 | 7/2006 | Baldwin et al. | |
| 2007/0177957 A1 | 8/2007 | Daggers et al. | |
| 2008/0021876 A1* | 1/2008 | Ahern | G06F 9/4436 |
| 2008/0133486 A1* | 6/2008 | Fitzgerald | G06F 9/5077 |
| 2008/0222513 A1* | 9/2008 | Van Den Berge | H04N 1/00209 |
| | | | 715/234 |
| 2009/0055742 A1 | 2/2009 | Nordhagen | |
| 2009/0113397 A1 | 4/2009 | Wright, Sr. | |
| 2009/0177957 A1 | 7/2009 | Bouillet et al. | |
| 2010/0082576 A1* | 4/2010 | Walker | G06F 17/30038 |
| | | | 707/706 |
| 2010/0146015 A1* | 6/2010 | Milic-Frayling | G06F 17/30115 |
| | | | 707/812 |
| 2011/0106835 A1* | 5/2011 | Lauridsen | G06F 17/3089 |
| | | | 707/769 |
| 2011/0145258 A1* | 6/2011 | Kankainen | G06Q 10/10 |
| | | | 707/746 |
| 2011/0178973 A1 | 7/2011 | Lopez et al. | |
| 2011/0289077 A1* | 11/2011 | Wade | G06Q 30/02 |
| | | | 707/723 |
| 2012/0079017 A1 | 3/2012 | Ingrassia, Jr. et al. | |
| 2012/0159304 A1* | 6/2012 | Listou | G06F 17/30392 |
| | | | 715/227 |
| 2012/0231441 A1 | 9/2012 | Parthasarathy et al. | |
| 2013/0124465 A1 | 5/2013 | Pingel et al. | |
| 2013/0127596 A1 | 5/2013 | Jain et al. | |
| 2013/0173533 A1 | 7/2013 | Nichols | |
| 2013/0173671 A1* | 7/2013 | Jager | G06F 17/30289 |
| | | | 707/803 |
| 2013/0212576 A1* | 8/2013 | Huang | G06F 9/45558 |
| | | | 718/1 |
| 2013/0228615 A1* | 9/2013 | Gates | G06F 3/002 |
| | | | 235/375 |
| 2013/0232420 A1 | 9/2013 | Manzari et al. | |
| 2013/0246934 A1* | 9/2013 | Wade | G06F 3/04842 |
| | | | 715/745 |
| 2013/0254406 A1* | 9/2013 | Augenstein | G06F 11/324 |
| | | | 709/226 |
| 2013/0303085 A1* | 11/2013 | Boucher | H04W 4/008 |
| | | | 455/41.1 |
| 2014/0027510 A1* | 1/2014 | Assouline | G06Q 50/22 |
| | | | 235/385 |
| 2014/0067801 A1 | 3/2014 | Marvit et al. | |
| 2014/0081882 A1* | 3/2014 | Govindaraman | G06Q 50/01 |
| | | | 705/319 |
| 2014/0081967 A1* | 3/2014 | Morris | G06F 17/30997 |
| | | | 707/736 |
| 2014/0081968 A1* | 3/2014 | Morris | G06F 17/30997 |
| | | | 707/736 |
| 2014/0089419 A1* | 3/2014 | Morris | G06Q 10/107 |
| | | | 709/206 |
| 2014/0089420 A1* | 3/2014 | Morris | G06Q 10/107 |
| | | | 709/206 |
| 2014/0089421 A1* | 3/2014 | Morris | G06F 9/541 |
| | | | 709/206 |
| 2014/0112319 A1* | 4/2014 | Morris | H04W 4/12 |
| | | | 370/338 |
| 2014/0258968 A1* | 9/2014 | Brown | G06F 17/21 |
| | | | 717/103 |
| 2014/0258970 A1* | 9/2014 | Brown | G06F 8/47 |
| | | | 717/103 |
| 2015/0350103 A1 | 12/2015 | Bertram et al. | |

OTHER PUBLICATIONS

U.S. Appl. No. 14/498,156, entitled "Enabling a Tag to Show Status", filed Sep. 26, 2014.

List of IBM Patents or Patent Applications Treated as Related.

Dietz et al., "SurfaceWare: Dynamic Tagging for Microsoft Surface." Proceedings of the Third International Conference on Tangible and Embedded Interaction. ACM, 2009.

Abujarour et al., "Dynamic Tags for Dynamic Data Web Services." Proceedings of the 5th International Workshop on Enhanced Web Service Technologies. ACM, 2010.

Sah et al., "Programming the Internet from the Server-Side with Tcl and Audience1," Proceedings of the USENIX Fourth Annual Tcl/Tk Workshop Monterey, California, Jul. 1996.

Chang et al., "A Context Aware Handheld Wayfinding System for Individuals with Cognitive Impairments." Proceedings of the 10th International ACM SIGACCESS Conference on Computers and Accessibility. ACM, 2008.

Snyder et al. "RoboLeader for Reconnaissance by a Team of Robotic Vehicles." Collaborative Technologies and Systems (CTS), 2010 International Symposium on. IEEE, 2010.

Ross et al., "Interactive Mathematics on the Web: MathML for Signals and Systems Demonstrations." Proceedings of the American Control Conference, vol. 1. 2003.

Gautam et al., "An Improved Framework for Tag-Based Academic Information Sharing and Recommendation System." Proceedings of the World Congress on Engineering. vol. II, 2012.

Mirmohamadsadeghi et al., "Image Tag Propagation." Oct. 6, 2010, [Mar. 17, 2011]. http://mmspl.epfl.ch/webdav/site/mmspl/shared/Semesterproject_tagpropagation, pdf (2010).

Campbell "B72-4 System/360 Job Control Language." Computers, IEEE Transactions on 100.1 (1972): 108-109.

"ZoneTag: Photos and Talk of the ZoneTag Prototype"; flickr, Dec. 12, 2005, pp. 1-2, retrieved Jul. 14, 2014, <http://www.flickr.com/groups/zonetagusers/discuss/72157594213049684/>.

Naaman, Mor, "ZoneTag: Putting Your Photos in Context"; ZoneTag Demo at FoWA Summit, pp. 1-4, retrieved Jul. 14, 2014; <http://www.slideshare.net/mor/zonetag-demo-at-fowa-summit>.

Microsoft, "Styling and Templating", pp. 1-16, retrieved Jul. 14, 2014; <http://msdn.microsoft.com/en-us/library/ms745683%28v=vs.110%29.aspx>.

"Chef Documents: An Overview of Chef"; pp. 1-13, retrieved Jul. 14, 2014; <http://docs.opscode.com/chef_overview.html>.

U.S. Appl. No. 14/451,569, entitled "Performing Actions on Objects as a Result of Applying Tags to the Objects", filed Aug. 5, 2014.

* cited by examiner

| Name 101 | Type 102 | Category 103 | Tags 104 | | |
|---|---|---|---|---|---|
| Server 1 | POWER7 | compute | Rochester | DualVIOS | ⊗ |
| Server 2 | POWER7 | compute | Rochester | DualVIOS | 🕒 |
| Server 3 | POWER7 | compute | pci-compliant | ▮▮▯ | |
| Server 4 | POWER7 | compute | pci-compliant | ✓ | |

FIG. 1

ENABLING A TAG TO SHOW STATUS

BACKGROUND

The present invention relates to computer software, and more specifically, to computer software to enable a tag to show classification status, compliance, and aggregated health status in a cloud computing environment.

Tags are textual descriptors that users may apply to different resources, such as files or folders. However, tags do not display any status information regarding the tags themselves, or the resources the tags are applied to.

SUMMARY

Embodiments disclosed herein include at least a system, method, and computer program product to display the status of tags applied to objects in a cloud computing environment, by comparing an attribute of an object to a criterion of a tag applied to the object, wherein the object is part of the cloud computing environment, and outputting for display a graphical representation of the tag, wherein the graphical representation comprises a text of the tag and an indication of a result of the comparison.

BRIEF DESCRIPTION OF THE SEVERAL VIEWS OF THE DRAWINGS

FIG. 1 depicts a graphical user interface including tags that show status, according to one embodiment.

DETAILED DESCRIPTION

Figure 2:
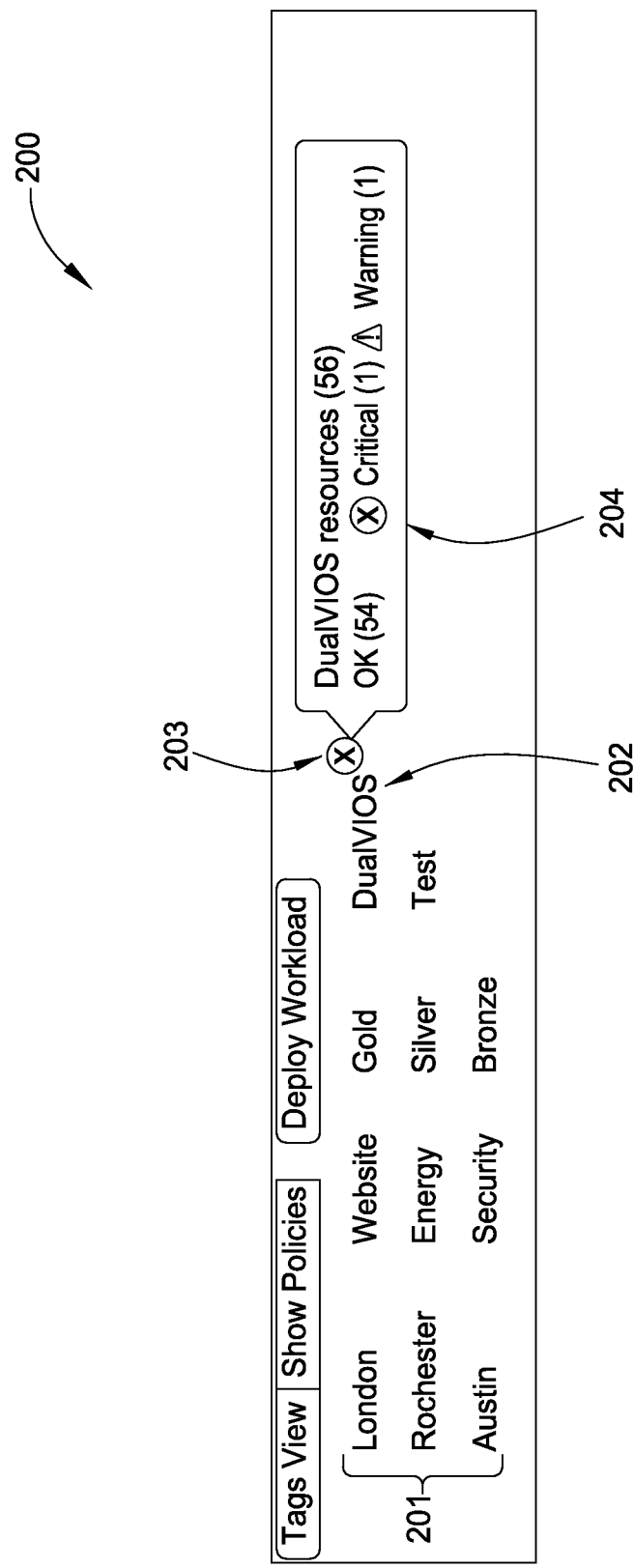
FIG. 2 depicts a graphical user interface including tags that show status, according to one embodiment.

Embodiments disclosed herein allow textual tags to display status information. Users may define any number of tags that include tag criteria as well as one or more actions that may be executed to cause a tagged object to comply with the tag criteria. When a user tags an object embodiments disclosed herein display a status of the tag. The status may generally indicate whether the tagged object complies with the tag criteria. The tag status may be added to the tag itself, and take any format sufficient to indicate whether the tagged object complies with the tag criteria. In addition, a progress indicator may also be added to the tag to indicate a progress towards causing the object to comply with the tag (for example, by performing the actions associated with the tag). In addition, embodiments disclosed herein may also aggregate all tag data across a cloud computing environment in order to communicate the status of all tagged items in the cloud.

For example, a user may tag a host machine in a cloud computing environment with a "backup" tag, indicating the host should be used for backup purposes. However, if the system has been-repurposed for production purposes, it is not being used as a backup system, and the tag is incorrect. In such a scenario, embodiments disclosed herein may analyze attributes of the host, compare them to the criteria of the "backup" tag, and determine that one or more criteria are not met by the host. When a user views attributes of the host machine, the "backup" tag may be displayed, which may be modified to show that the host machine does not currently comply with the tag criteria. For example, and without limitation, an "x" may be overlaid on the "backup" tag to indicate that the host does not meet the criteria of the "backup" tag. If multiple host servers are tagged with the "backup" tag, embodiments disclosed herein allow users to visualize the status of each tagged server in a consolidated, cloud-wide view.

Therefore, when a user tags an object, embodiments disclosed herein show if the object accurately reflects whether the object complies with the tag criteria. In addition, embodiments disclosed herein may allow users to track progress as the tag object is configured or altered to comply with the tag. If the predefined tag actions fail (i.e., they do not make the object compliant with the tag criteria), the tag will reflect the failed status.

A tag, as used herein, refers to a textual metadata classifier that annotates an object with a set of criteria which can be measured, so that the compliance is visually indicated to the user. Furthermore, a tag may provide an associated set of actions that cause tagged objects to comply with the criteria, if the tagged objects do not already comply with the criteria. If the tagged objects already comply with the criteria, the objects may be classified without acting on them. The tags may coexist with conventional tags in the same namespace. As used herein, an object may refer to, without limitation, any computing resource (software, hardware, or both), workflow, or workload.

FIG. 1 depicts a graphical user interface (GUI) 100 including tags that show status, according to one embodiment. As shown, the GUI 100 lists different resources in a cloud computing environment. Each resource includes a name 101, a type 102, a category 103, and a set of tags 104. The name 101 may be a name of a resource, such as the servers 1-4. The type 102 indicates a type of the resource, such as a Power7 server. The category 103 indicates a category the resource belongs to, such as compute node. Although depicted to facilitate explanation of the disclosure, the type 102 and the category 103 are not required to enable tagging of an object. A tag may be applied to any label or identifier sufficient to uniquely identify an object. The tags 104 are a set of user-defined tags that have been applied to the object, in this example, the servers 1-4. Generally, tags may be applied to any resource in a computing environment, such as hardware (physical or virtual), software, any combination of hardware and software, or a workflow targeting cloud resources. The tags may be associated with a specified set of criteria and a set of actions that alter the resource to make the object comply with the set of criteria. Generally, a user may define any number and type of tags for any object.

As shown, tags 105-108 also reflect the current status of each tag, as applied to respective server 1-4. Specifically, the status of each tag is reflected by indicators 110-113. Generally, the specific visualization of the tag status indicators may take any form, such as a status overlay, a font style change, or other graphic underlying the tag text itself. For example, indicator 110, an "x," indicates that server 1 does not comply with the DualVIOS tag. The DualVIOS tag may be defined as including dual virtual I/O servers. In order to display the status of the DualVIOS tag (as applied to server 1), embodiments disclosed herein may compare the properties of server 1 to the criteria of the DualVIOS tag. In order to obtain the properties of server 1, embodiments disclosed herein may maintain information regarding the configuration and capabilities of server 1, or receive the properties of server 1 directly (from server 1 itself, or a proxy, such as a management controller). Once the properties of server1 are compared to the criteria of the DualVIOS tag, embodiments disclosed herein may reflect the results of the comparison in the tag. In this case, as shown, server 1 does not comply with the requirements of the DualVIOS tag, and the indicator 110 has been added to reflect the deficiency. Generally, the indicator 110 reflects that server 1 is not currently executing dual virtual I/O servers (for whatever reason).

As shown, DualVIOS tag 106 includes a clock indicator 111 which reflects that operations are being performed to cause server 2 to comply with the DualVIOS tag 106. In addition, the DualVIOS tag 106 is being filled in to reflect the progress of the operations to configure the DualVIOS servers on server 2. As the configuration operations near completion, the tag 106 will be filled to match the progress of the configuration options. Similarly, the tag 107 includes a status indicator 112, which reflects the state of operations to cause server 3 to comply with the PCI-compliant tag 107. The status indicator 112 may take any form, such as a percentage towards completion (e.g., 33%), or a time until completion (e.g., "Compliant in 15 hours). As shown, server 4 is in compliance with the PCI-compliant tag, as reflected by the checkmark indicator 113. Generally, any indication may be applied to a tag in order to reflect the status of the tag, as applied to a resource. In addition, the indication may reflect a status of the actions associated with the tag, which are executed to cause the tagged object to comply with the tag criteria.

FIG. 2 depicts a graphical user interface (GUI) 200 including tags that show status, according to one embodiment. Generally, the GUI 200 allows a user to visualize the status of multiple tagged objects in a given domain, such as a cloud computing environment. As shown, the GUI 200 includes a set of tags 201. The tags 201 may have been applied to one or more items in the domain. The tags 201 may also include status indicators which reflect the domain-wide status of each tag. As shown, the DualVIOS tag 202 includes a status indicator 203, which reflects that there are errors or issues related to at least one object which has been tagged with the DualVIOS tag. When a user hovers over (or clicks on) the tag 202, the box 204 appears to display information regarding the tag. Specifically, the box 204 reflects that of 56 resources tagged with the DualVIOS tag, 54 are "OK," or have no issues, while one resource has a critical issue, and another resource has a warning issue. From this action box 204, the user may further click on items to see expanded details.

Figure 3:
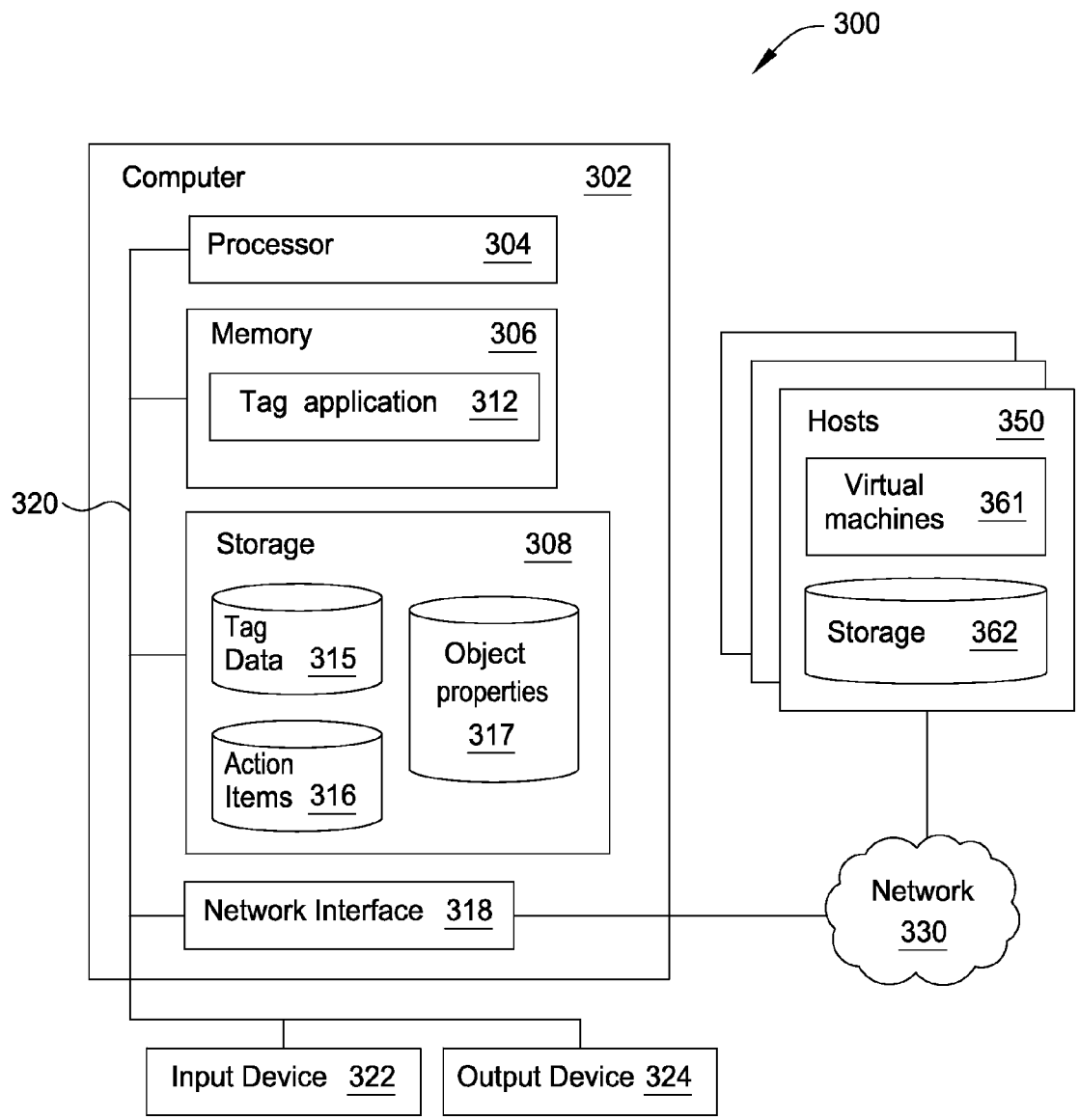
FIG. 3 illustrates a system to enable a tag to show status, according to one embodiment.

FIG. 3 illustrates a system 300 to enable a tag to show status, according to one embodiment. The computer 302 may also be connected to other computers via a network 330. In general, the network 330 may be a telecommunications network and/or a wide area network (WAN). In a particular embodiment, the network 330 is the Internet.

The computer 302 generally includes a processor 304 connected via a bus 320 to a memory 306, a network interface device 318, a storage 308, an input device 322, and an output device 324. The computer 302 is generally under the control of an operating system (not shown). Examples of operating systems include the UNIX operating system, versions of the Microsoft Windows operating system, and distributions of the Linux operating system. (UNIX is a registered trademark of The Open Group in the United States and other countries. Microsoft and Windows are trademarks of Microsoft Corporation in the United States, other countries, or both. Linux is a registered trademark of Linus Torvalds in the United States, other countries, or both.) More generally, any operating system supporting the functions disclosed herein may be used. The processor 304 is included to be representative of a single CPU, multiple CPUs, a single CPU having multiple processing cores, and the like. The network interface device 318 may be any type of network communications device allowing the computer 302 to communicate with other computers via the network 330.

The storage 308 may be a persistent storage device. Although the storage 308 is shown as a single unit, the storage 308 may be a combination of fixed and/or removable storage devices, such as fixed disc drives, solid state drives, SAN storage, NAS storage, removable memory cards or optical storage. The memory 306 and the storage 308 may be part of one virtual address space spanning multiple primary and secondary storage devices.

The input device 322 may be any device for providing input to the computer 302. For example, a keyboard and/or a mouse may be used. The output device 324 may be any device for providing output to a user of the computer 302. For example, the output device 324 may be any conventional display screen or set of speakers. Although shown separately from the input device 322, the output device 324 and input device 322 may be combined. For example, a display screen with an integrated touch-screen may be used.

As shown, the memory 306 contains a tag application 312, which is an application generally configured to apply user-defined tags to computing objects, and cause user-defined actions to be applied to tagged objects. In addition, the tag application 312 may be configured to display the status of each tag as applied to a given object. The status may reflect compliance, health issues, and progress indicators for each tag. Generally, users may define any types of tags, which may be stored in the tag data 315. When a user applies a tag to an object, such as hardware, software, or a combination thereof, the tag application 312 may identify the tag criteria, and compare the criteria to the tagged object. The object properties may be stored in the object properties 317, or the object properties may be retrieved by querying a resource, or an application managing the resource. If the object complies with the criteria, the tag application 312, in some cases, may not take any further action. If the object does not comply with the tag criteria, the tag application 312 may perform one or more predefined actions to bring the object into compliance with the tag. The actions may be stored in the action items 316. In addition, the tag application 312 may reflect the results of the comparison. For example, if a user tags a server as "webserver," the tag application 312 may identify the corresponding tag in the tag data 315, identify any action items 316 that cause a server to be configured as a web server, and execute the steps necessary to configure the server to host a web server. When displaying the tag in a GUI, the tag application 312 may reflect the status of the tag. For example, if the server is not configured as a web server when the "webserver" tag is applied, the tag application 312 may modify the tag to indicate that the server is not compliant with the tag. One example of such an indication is the indication 110 in FIG. 1. As the tag application 312 causes the predefined webserver configuration actions to be performed, the tag application 312 may display a progress indicator of the configuration process. The progress indicator 112 of FIG. 1 is an example of a progress indicator that the tag application 312 may use to reflect the progress of the actions to configure the web server in order to cause the tagged server to comply with the "webserver" tag. When the actions associated with the tag are executed, the tag application 312 may update the indicator to reflect the status of the tag. If, for example, the server was successfully configured to host a web server according to the criteria in the tag data 315, the tag application 312 may update the tag to include an indicator reflective of the successful configuration. One example of such a success indicator is indicator 113 of FIG. 1. If the configuration was unsuccessful, the tag application 312 may display an indicator reflecting the failure and/or non-compliance of the server with the "webserver" tag. At any given point, the tag application 312 may optionally store the current status of the tag for the server in the object properties 317.

As shown, storage 308 contains the tag data 315, action items 316, and object properties 317. The tag data 315 contains a plurality of tags that may be applied directly to an object, such as a computing resource or a workload that targets computing resources. The tags in the tag data 315 may be associated with specific criteria and a set of actions that may alter a resource to comply with the tag criteria. The tag data 315 may also include a plurality of different status indicators used to reflect the status of the tags. The action items 316 is a repository of computer-executable code, scripts, or other configuration methods that may alter objects in order to make the resources comply with different tag criteria. In at least one embodiment, the action items 316 may themselves be tagged with tags from the tag data 315. Similarly, the tag data 315 may specify associated items in the action items 315. Doing so associates the tags in the tag data 315 with predefined actions in the action items 316, which allows the tag application 312 to ensure that objects are configured according to the tag criteria. The object properties 317 is a store configured to hold configuration information and other attributes of objects in the system 300. The object properties 317 may generally include configuration and attributes of computing resources or workflows. For example, hardware configurations, software configurations, and other information about one or more hosts 350, virtual machines, and other computing resources may be defined. In addition, the object properties 317 may store the tags that have been applied to objects, and a status of each tag (e.g., whether the object complies with the tag criteria).

The hosts 350 are compute nodes which perform different computing functions. For example, the hosts 350 may be configured to execute one or more virtual machines 361, or store data in storage locations 362. In one embodiment, the hosts 350 may be compute nodes in a cloud computing environment.

Figure 4:
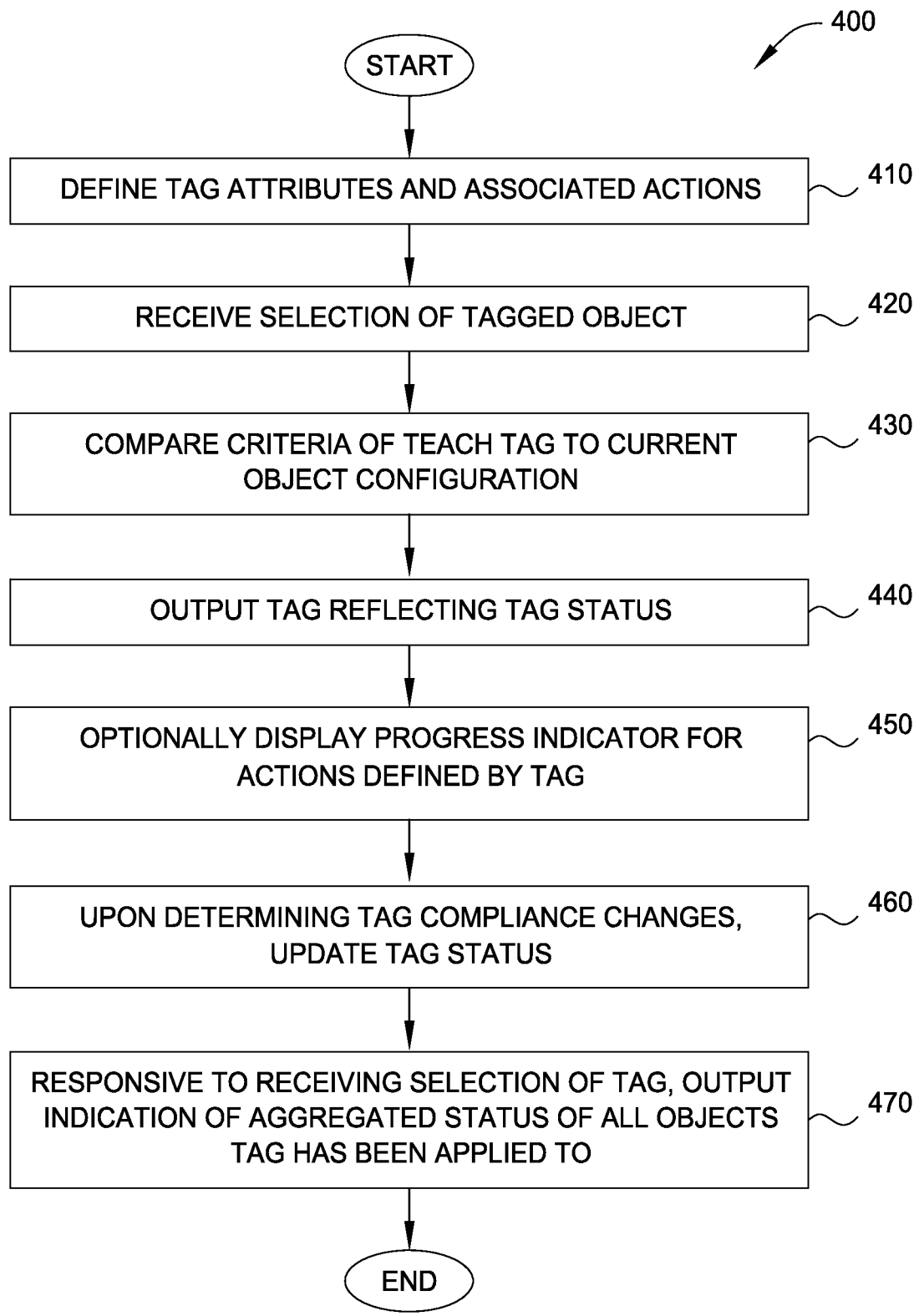
FIG. 4 illustrates a method to enable a tag to show status, according to one embodiment.

FIG. 4 illustrates a method 400 to enable a tag to show status, according to one embodiment. Generally, the steps of the method 400 allow a tag to display the status of the tag as applied to one or more objects. In at least one embodiment, the tag application 312 performs the steps of the method 400. Generally, tagged objects may be viewed in any number of ways, at any number of times, and in any number of contexts. Regardless of any of these variables, the tags, when displayed to a user, will reflect the current status of the tag. The tags may generally reflect the object's compliance with tag criteria, progress towards completing actions associated with the tag, and any other status attribute of the tag and/or the tagged object.

At step 410, a user may define tag attributes, criteria, and associated actions that are performed responsive to a user tagging an object with the tag. For example, a user may define a "SecurityCertified" tag, which may specify a set of security parameters for a hardware object, software object, or combination thereof. The tag attributes and criteria may be stored in the tag data 315. The user may further specify actions associated with the tag, such as applying security to communications transmitted by the object, configuring firewalls, and the like. The associated actions may be stored in the action items 316. When a user applies a tag to an object, the tag application 312 may execute the associated actions in order to cause the object to comply with the tag criteria. In addition, the tag application 312 may also store the tag in a record for the tagged object in the object properties 317, reflecting that the tag has been applied to the object.

At step 420, the tag application 312 may receive user input selecting a tagged object. For example, the user may select a compute node (i.e., a server) in a cloud computing environment that has been tagged with the SecurityCertified tag. At step 430, the tag application 312 compares (for each tag applied to the selected object) the tag criteria, which may be stored in the tag data 315, to the selected object's current configuration. The tag application 312 may identify each tag applied to the selected object by referring to the object properties 317. The tag application 312 may compare the object properties to the criteria in order to determine whether the object complies with the tag criteria of each tag. For example, the tag application 312 may determine whether the server, tagged with the SecurityCertified tag, complies with the predefined attributes and criteria of the SecurityCertified tag. The tag application 312 may retrieve the server properties and configuration information from the object properties 317, the server itself, or a proxy, such as a management controller that manages the server.

At step 440, the tag application 312 may output a tag reflecting the tag status of each tag. The tag status may indicate the result of the comparison, which reflects whether the tagged object complies with the criteria of each tag. If the object complies with the tag criteria, an indication of compliance (such as a checkmark) may be displayed with the tag. If the object does not comply with the tag criteria for a tag, such as the SecurityCertified tag of the tagged server, the tag application 312 may generate an indication reflecting that the server is not compliant. The indications may generally take any form sufficient to indicate tag status. At step 440, the tag application 312 may optionally display a progress indicator reflecting progress towards completion of the actions associated with the tag at step 410. In some embodiments, the progress indicator may reflect progress towards compliance, as defined by a number of tag criteria that are met by the object. The progress indicator, in some embodiments, may be displayed only when an object is being reconfigured according to the predefined actions associated with the tag. The object may be reconfigured, for example and without limitation, when the tag is applied to an object, the object properties change, or the tag criteria change.

At step 460, the tag application 312, upon determining that the object's tag compliance changes, may update the tag status to reflect the change in compliance. The object's tag compliance may change for any number of reasons, such as modification, deletion, or addition of tag criteria, or a change in object properties. For example, a server tagged as "SecurityCompliant" may initially have a SecurityCompliant tag that reflects that the server is indeed security compliant, as determined by the comparison at step 430. If, however, the SecurityCompliant tag criteria change (for example, the security policies change), the server may no longer be compliant the SecurityCompliant tag until the server is reconfigured. In such a case, the tag application 312 may update the tag of the server to reflect that the server is no longer compliant with the SecurityCompliant tag. Generally, an object's tag compliance may change for any number of reasons, and the tag application 312 may reflect the state of the tag based on any of these changes. Again, when an object's tags are displayed, the current state of the tag is reflected in a GUI, such as the GUI 100, displaying the object properties.

At step 470, the tag application 312, responsive to receiving selection of a tag, may output an indication of the aggregated status of all objects that the tag has been applied to. For example, in a cloud environment, a user may tag thousands of resources with different tags reflecting the purpose of those resources. A tag cloud may quickly help the user filter the resources by clicking on a specific tag. If there is an object or resource that is not compliant with a tag, the tag application 312 may reflect the noncompliance, as shown in FIG. 2. Furthermore, the user may select multiple tags in order to display all resources or objects that have been tagged with each tag. Furthermore, if a tag is not mapped to any criteria or actions, the comparison at step 430 will fail, and the user's attention may be drawn to those tags which require attention (e.g., tags which require criteria or actions to be defined).

Advantageously, embodiments disclosed herein allow tags to show a tagged object's compliance with tag criteria. The criteria mapped to the tag may be compared to the attributes of the object. If the comparison shows differences, the tag will be configured to display an indication that the object is not in compliance. The specific visualization may take any form, such as a status overlay, a font style change, or other graphic underlying the tag text itself. By causing tags to reflect status, embodiments disclosed herein allow users to visualize whether the tagged object accurately reflects what the tag represents. The tag may include progress indicators to allow users to visualize the configuration process. If the configuration actions fail, the tag will reflect this failure. Further still, tags in a tag cloud may now be configured to communicate the overall status of all tagged items.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

For convenience, the Detailed Description includes the following definitions which have been derived from the "Draft NIST Working Definition of Cloud Computing" by Peter Mell and Tim Grance, dated Oct. 7, 2009, which is cited in an IDS filed herewith, and a copy of which is attached thereto.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
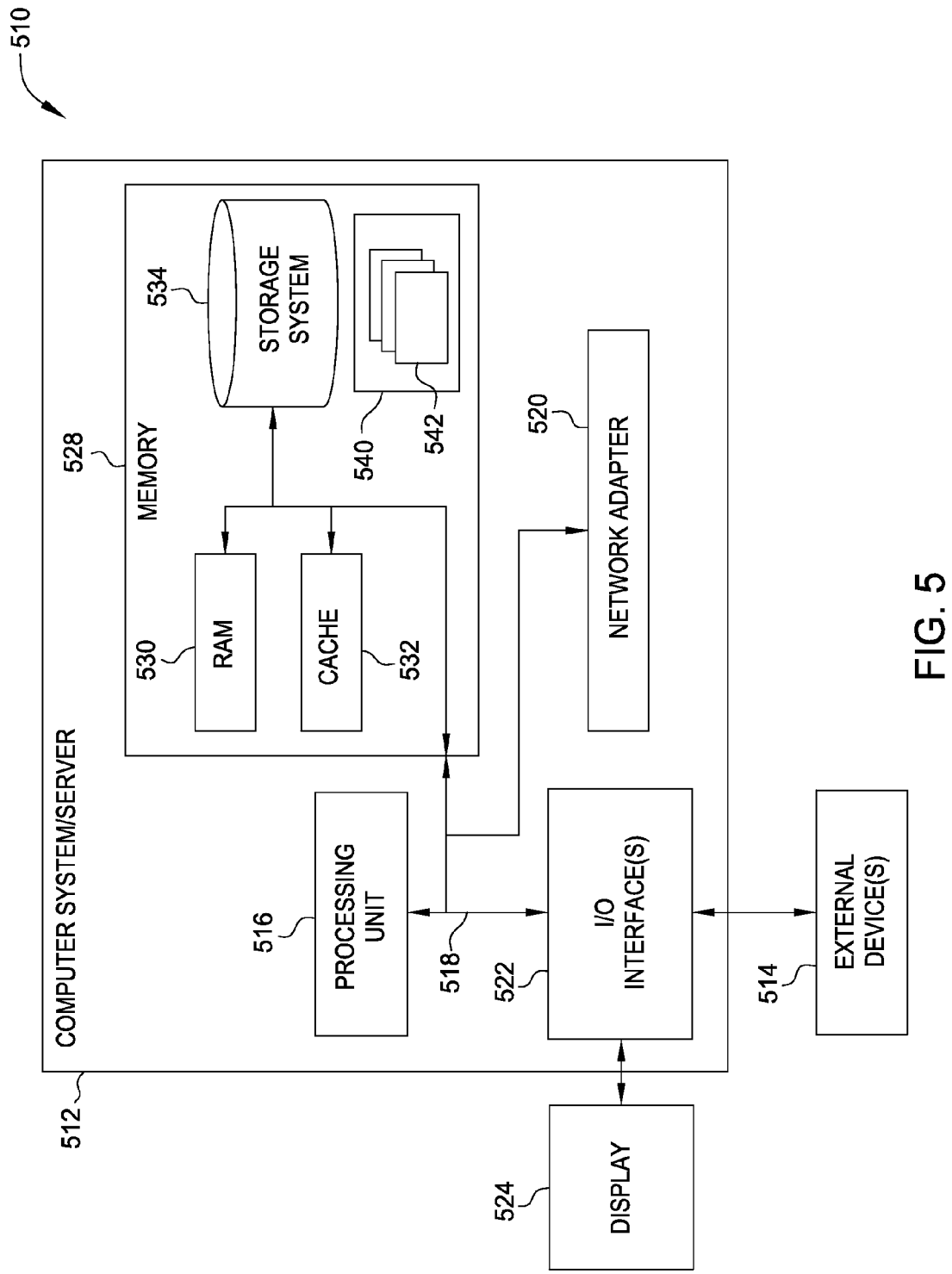
FIG. 5 depicts a cloud computing node according to an embodiment of the present invention.

Referring now to FIG. 5, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 510 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 512 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 512 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, computer system/server 512 in cloud computing node 510 is shown in the form of a general-purpose computing device. The components of computer system/server 512 may include, but are not limited to, one or more processors or processing units 516, a system memory 528, and a bus 518 that couples various system components including system memory 528 to processor 516.

Bus 518 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 512 typically includes a variety of computer system readable media. Such media may be any available media that is accessible by computer system/server 512, and it includes both volatile and non-volatile media, removable and non-removable media.

System memory 528 can include computer system readable media in the form of volatile memory, such as random access memory (RAM) 530 and/or cache memory 532. Computer system/server 512 may further include other removable/non-removable, volatile/non-volatile computer system storage media. By way of example only, storage system 534 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 518 by one or more data media interfaces. As will be further depicted and described below, memory 528 may include at least one program product having a set (e.g., at least one) of program modules that are configured to carry out the functions of embodiments of the invention.

Program/utility 540, having a set (at least one) of program modules 542, may be stored in memory 528 by way of example, and not limitation, as well as an operating system, one or more application programs, other program modules, and program data. Each of the operating system, one or more application programs, other program modules, and program data or some combination thereof, may include an implementation of a networking environment. Program modules 542 generally carry out the functions and/or methodologies of embodiments of the invention as described herein.

Computer system/server 512 may also communicate with one or more external devices 514 such as a keyboard, a pointing device, a display 24, etc.; one or more devices that enable a user to interact with computer system/server 512; and/or any devices (e.g., network card, modem, etc.) that enable computer system/server 512 to communicate with one or more other computing devices. Such communication can occur via I/O interfaces 522. Still yet, computer system/server 512 can communicate with one or more networks such as a local area network (LAN), a general wide area network (WAN), and/or a public network (e.g., the Internet) via network adapter 520. As depicted, network adapter 520 communicates with the other components of computer system/server 512 via bus 518. It should be understood that although not shown, other hardware and/or software components could be used in conjunction with computer system/server 512. Examples, include, but are not limited to: microcode, device drivers, redundant processing units, external disk drive arrays, RAID systems, tape drives, and data archival storage systems, etc.

Figure 6:
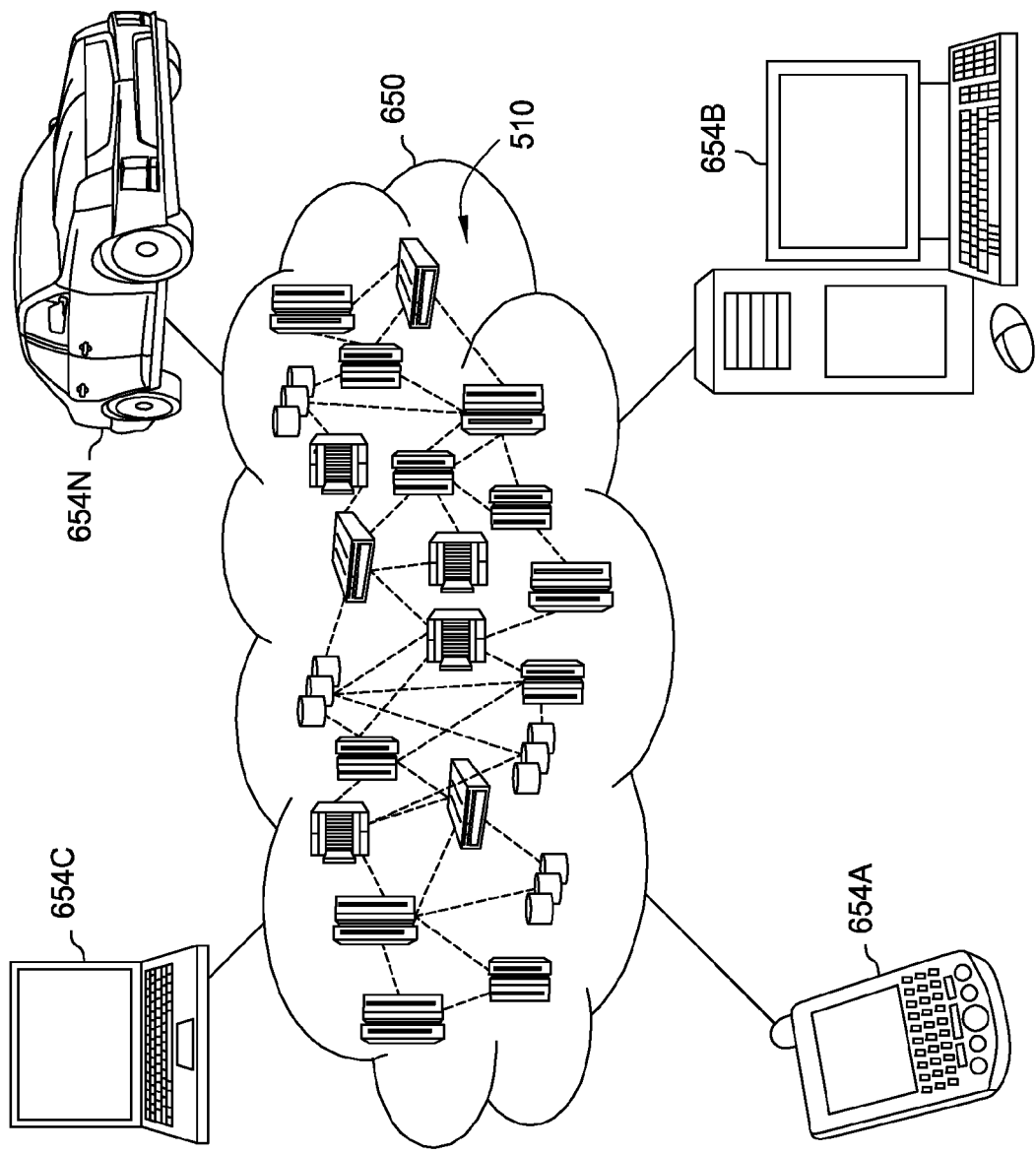
FIG. 6 depicts a cloud computing environment according to an embodiment of the present invention.

Referring now to FIG. 6, illustrative cloud computing environment 650 is depicted. As shown, cloud computing environment 650 comprises one or more cloud computing nodes 510 with which local computing devices used by cloud consumers, such as, for example, personal digital assistant (PDA) or cellular telephone 654A, desktop computer 654B, laptop computer 654C, and/or automobile computer system 654N may communicate. Nodes 510 may communicate with one another. They may be grouped (not shown) physically or virtually, in one or more networks, such as Private, Community, Public, or Hybrid clouds as described hereinabove, or a combination thereof. This allows cloud computing environment 650 to offer infrastructure, platforms and/or software as services for which a cloud consumer does not need to maintain resources on a local computing device. It is understood that the types of computing devices 654A-N shown in FIG. 6 are intended to be illustrative only and that computing nodes 510 and cloud computing environment 650 can communicate with any type of computerized device over any type of network and/or network addressable connection (e.g., using a web browser).

Figure 7:
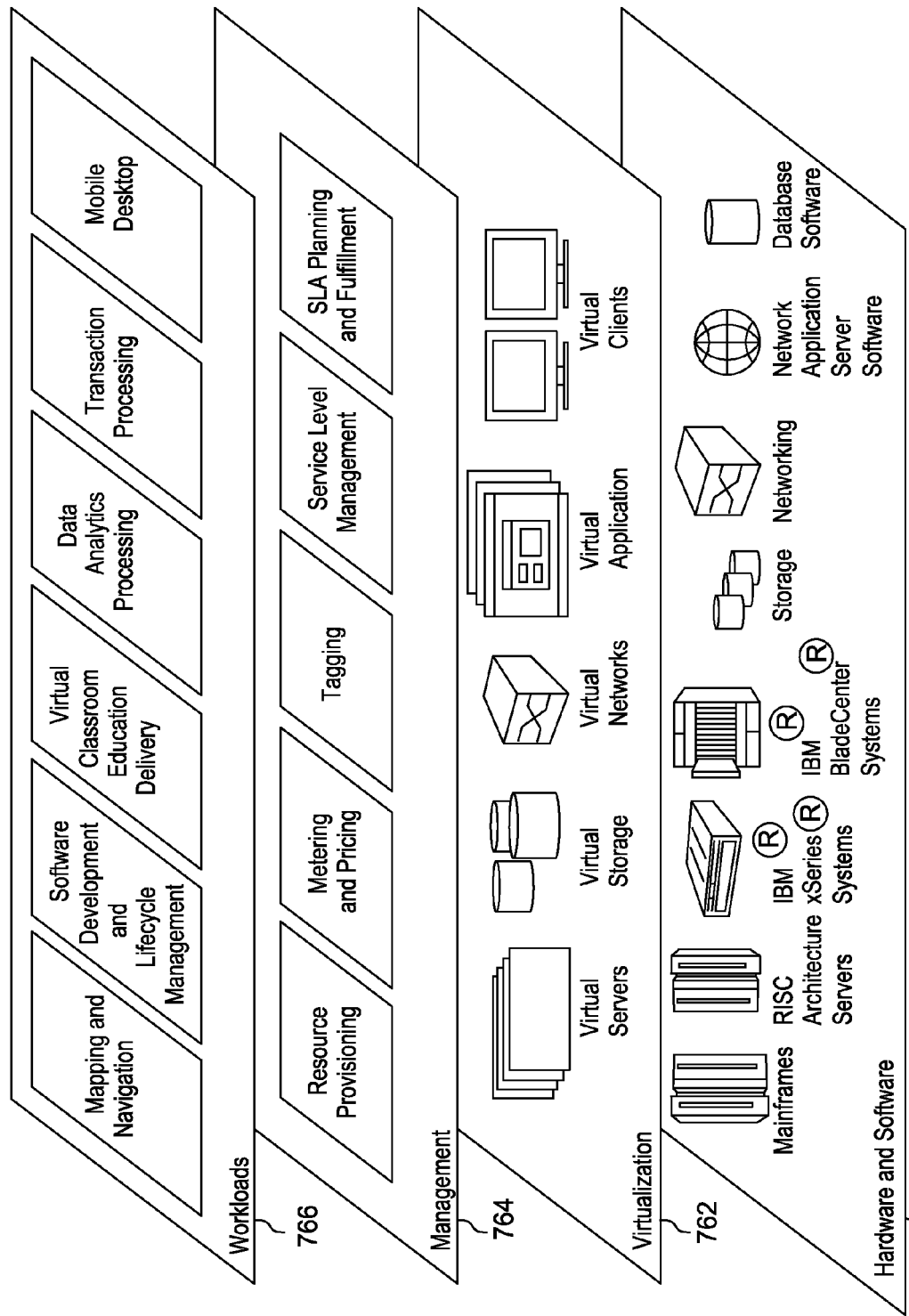
FIG. 7 depicts abstraction model layers according to an embodiment of the present invention.

Referring now to FIG. 7, a set of functional abstraction layers provided by cloud computing environment 650 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 760 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide)

Virtualization layer 762 provides an abstraction layer from which the following examples of virtual entities may be provided: virtual servers; virtual storage; virtual networks, including virtual private networks; virtual applications and operating systems; and virtual clients.

In one example, management layer 764 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. Tagging allows users to tag objects in the cloud computing environment and cause the objects to conform to the applied tags. The status of tagged objects throughout the cloud computing environment may be graphically displayed on the tags themselves, as described in greater detail above. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 766 provides examples of functionality for which the cloud computing environment may be utilized. Examples of workloads and functions which may be provided from this layer include: mapping and navigation; software development and lifecycle management; virtual classroom education delivery; data analytics processing; transaction processing; and mobile desktop.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A system, comprising:
    a computer processor; and
    a memory containing a program, which when executed by the processor, performs an operation to display a status of tags applied to objects in a cloud computing environment, the operation comprising:
        comparing an attribute of an object to a criterion of a tag applied to the object, wherein the criterion specifies a requirement that the object must comply with as a consequence of the tag being applied to the object, and wherein the object is part of the cloud computing environment;
        outputting for display a graphical representation of the tag, wherein the graphical representation comprises a text of the tag and an indication of a result of the comparison;
        determining, based on the result of the comparison, that the object does not comply with the requirement;
        identifying a set of actions associated with the tag, wherein the set of actions, when performed, modify at least one of the object and the cloud computing environment to cause the object to comply with the requirement;
        initiating performance of the set of actions associated with the tag to cause the object to comply with the requirement;
        while the set of actions are being performed, modifying the outputted graphical representation of the tag to include a progress indicator reflecting a progress toward completion of each action of the set of actions;
        upon determining that performance of a first action of the set of actions failed, modifying the outputted graphical representation of the tag to indicate that the first action failed; and
        outputting for display an indication of an aggregated status of each object in the cloud computing environment that the tag has been applied to.

2. The system of claim 1, wherein the tag further comprises the set of actions, wherein the set of actions are performed responsive to applying the tag to the object, wherein modifying the outputted graphical representation further comprises outputting an estimated amount of time until each action of the set of actions is completed, wherein the object comprises a workload targeting a hardware resource in the cloud computing environment.

3. The system of claim 2, the operation further comprising: upon determining that performance of a second action of the set of actions completed successfully, modifying the outputted graphical representation of the tag to indicate that the second action completed successfully.

4. The system of claim 1, wherein the criterion is compared to attributes of each of a plurality of objects in the cloud computing environment, wherein the graphical representation further comprises a representation of the result of the comparison of the criterion to each of the plurality of objects to show an overall status of the tag in the cloud computing environment.

5. The system of claim 1, wherein the aggregated status is outputted for display responsive to receiving selection of the graphical representation of the tag.

6. The system of claim 1, wherein a plurality of tags are defined in the cloud computing environment, wherein each tag comprises a respective criterion and action, wherein the action causes a tagged item to comply with the criterion of the tag.

7. The system of claim 1, wherein the graphical representation is outputted responsive to user input selecting the object, wherein the comparison determines whether the object complies with the tag criterion.

8. The system of claim 1, wherein the object comprises a first object, the operation further comprising:

determining that the tag is applied to a second object comprising a workload targeting the first object, wherein the first object is a hardware resource in the cloud computing environment;

comparing an attribute of the second object to the criterion of the tag;

determining, based on the comparing, that the attribute of the second object does not comply with the requirement of the tag;

identifying a second set of actions associated with the tag, wherein the second set of actions, when performed, modify the object to cause the second object to comply with the requirement; and initiating performance of the second set of actions associated with the tag to cause the second object to comply with the requirement.

9. The system of claim 8, the operation further comprising: while the second set of actions are being performed, modifying the outputted graphical representation of the tag to include a progress indicator reflecting a progress toward completion of each action of the second set of actions.

10. A computer program product to display a status of tags applied to objects in a cloud computing environment, the computer program product comprising:

a non-transitory computer-readable storage medium having computer-readable program code embodied therewith, the computer-readable program code executable by a processor to perform an operation comprising:

comparing an attribute of an object to a criterion of a tag applied to the object, wherein the criterion specifies a requirement that the object must comply with as a consequence of the tag being applied to the object, and wherein the object is part of the cloud computing environment;

outputting for display a graphical representation of the tag, wherein the graphical representation comprises a text of the tag and an indication of a result of the comparison;

determining, based on the result of the comparison, that the object does not comply with the requirement;

identifying a set of actions associated with the tag, wherein the set of actions, when performed, modify at least one of the object and the cloud computing environment to cause the object to comply with the requirement;

initiating performance of the set of actions associated with the tag to cause the object to comply with the requirement;

while the set of actions are being performed, modifying the outputted graphical representation of the tag to include a progress indicator reflecting a progress toward completion of each action of the set of actions;

upon determining that performance of a first action of the set of actions failed, modifying the outputted graphical representation of the tag to indicate that the first action failed; and outputting for display an indication of an aggregated status of each object in the cloud computing environment that the tag has been applied to.

11. The computer program product of claim 10, wherein the tag further comprises the set of actions, wherein the set of actions are performed responsive to applying the tag to the object, wherein modifying the outputted graphical representation further comprises outputting an estimated amount of time until each action of the set of actions is completed, wherein the object comprises a workload targeting a hardware resource in the cloud computing environment.

12. The computer program product of claim 11, the operation further comprising: upon determining that performance of a second action of the set of actions completed successfully, modifying the outputted graphical representation of the tag to indicate that the second action completed successfully.

13. The computer program product of claim 11, wherein the aggregated status is outputted for display responsive to receiving selection of the graphical representation of the tag.

14. The computer program product of claim 10, wherein the criterion is compared to attributes of each of a plurality of objects in the cloud computing environment, wherein the graphical representation further comprises a representation of the result of the comparison of the criterion to each of the plurality of objects to show an overall status of the tag in the cloud computing environment.

15. The computer program product of claim 10, wherein the graphical representation is outputted responsive to user input selecting the object, wherein a plurality of tags are defined in the cloud computing environment, wherein each tag comprises a respective criterion and action, wherein the action causes a tagged item to comply with the criterion of the tag, wherein the comparison determines whether the object complies with the tag criterion.

16. The computer program product of claim 10, wherein the object comprises a first object, the operation further comprising:

determining that the tag is applied to a second object comprising a workload targeting the first object, wherein the first object is a hardware resource in the cloud computing environment;

comparing an attribute of the second object to the criterion of the tag;

determining, based on the comparing, that the attribute of the second object does not comply with the requirement of the tag;

identifying a second set of actions associated with the tag, wherein the second set of actions, when performed, modify the object to cause the second object to comply with the requirement; and initiating performance of the second set of actions associated with the tag to cause the second object to comply with the requirement.

17. The computer program product of claim 16, the operation further comprising: while the second set of actions are being performed, modifying the outputted graphical representation of the tag to include a progress indicator reflecting a progress toward completion of each action of the second set of actions.

* * * * *